June 19, 1951  C. R. TURNER  2,557,706
TOASTER
Filed Dec. 13, 1946  2 Sheets-Sheet 1
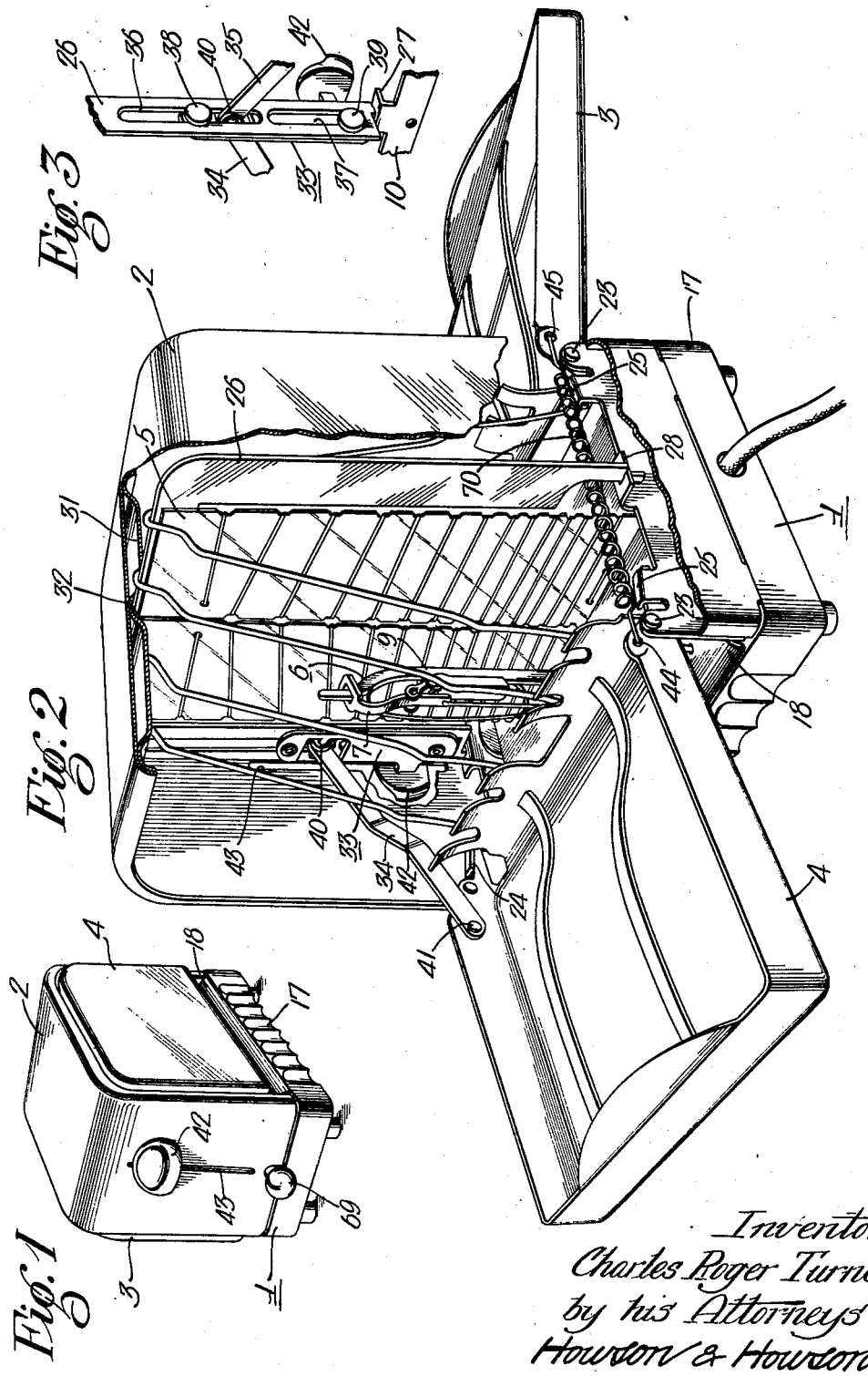
Inventor:
Charles Roger Turner
by his Attorneys
Howson & Howson Patented June 19, 1951

2,557,706

UNITED STATES PATENT OFFICE 2,557,706

TOASTER

Charles Roger Turner, Enfield, Springfield Township, Montgomery County, Pa., assignor to Proctor Electric Company, Philadelphia, Pa., a corporation of Pennsylvania Application December 13, 1946, Serial No. 716,021

5 Claims. (Cl. 99—395)

This invention relates to bread toasters, and has for its general object the provision of a toaster embodying certain novel improvements as hereinafter described.

Notwithstanding the development of the automatic toaster, there is a large demand for non-automatic toasters particularly in view of their relatively low cost. The most popular low-priced non-automatic toaster is the hinged door type wherein the bread slices are supported by the doors, and the bread slices are turned over by opening and closing the doors.

A specific object of the present invention is to provide an improved toaster of the hinged door type which embodies a simple, rugged and low-cost construction.

A further object of the invention is to provide such a toaster which embodies a mechanism for easy operation of the doors by the vertical movement of a single control knob.

Other objects and features of the invention will be apparent from the following detailed description with reference to the accompanying drawings wherein:

Fig. 1 is a small scale perspective view of a toaster constructed according to the present invention;

Fig. 2 is a perspective view of the toaster with the doors open, and with portions of the toaster body broken away for the purpose of illustration;

Fig. 3 is a detail perspective view of the slider arrangement by which the doors are operated;

Figure 4:
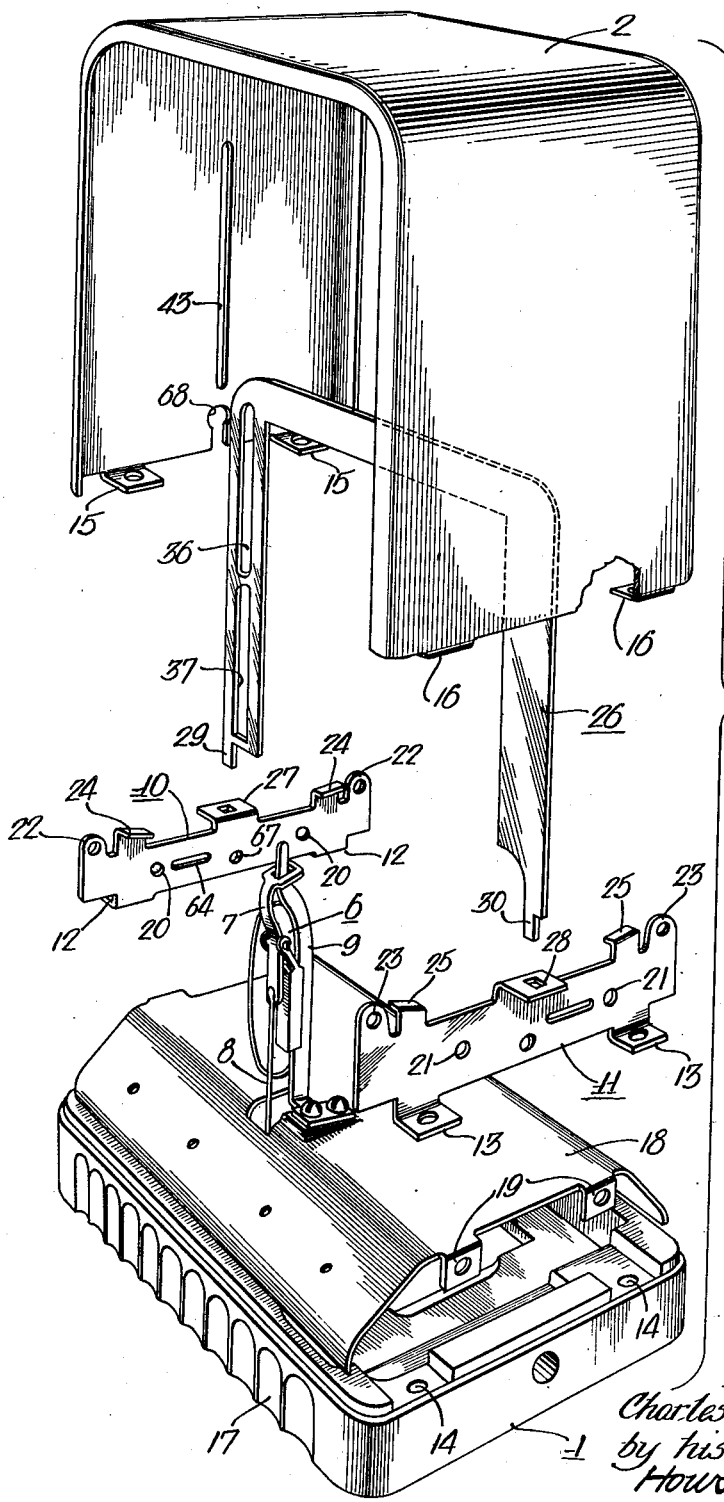
Fig. 4 is an exploded perspective view showing certain parts of the toaster.

Referring first to Figs. 1 to 4, the toaster shown comprises a generally rectangular base 1, an arch-shaped member 2 secured to said base, and a pair of opposed doors 3 and 4 which are pivoted at their bottoms and may be opened outwardly as shown in Fig. 2. The elements mentioned form an enclosure or chamber within which the bread is confined during the toasting operation, as will be well understood. The heating unit, designated generally by reference numeral 5, is disposed centrally of the said chamber so as to apply heat to the inner sides of both of the bread slices supported by doors 3 and 4. A thermostatic device, designated generally by reference character 6, is arranged so as to respond to the temperature of one of the bread slices and serves to actuate a switch mechanism, as hereinafter described. The present invention is not concerned with the details of construction of the thermostatic device 6, which forms the subject of a copending Stevenson et al. application, Serial No. 779,120 filed October 10, 1947. However, it may be noted that the thermostatic device 6 comprises a thermomotive element 7 engageable by one of the bread slices so as to respond to the surface temperature thereof, and adapted to move a switch-actuating rod 8 which is secured to element 7 and which extends into the base of the toaster (see Fig. 4) to actuate a switch mechanism disposed therein. The thermomotive element 7 is supported by a support 9 which is attached to the base as clearly shown in Fig. 4.

Referring more particularly to the toaster construction, as provided in accordance with the present invention, there are provided a pair of end plates or supports 10 and 11 which are secured to the ends of the base 1, as may be seen in Figs. 2 and 4. These plates are provided with extending ears or tabs 12 and 13 by which they are secured to the base by means of screws or the like, the base being provided with apertures, such as shown at 14, to receive the fastening elements. Similarly, the arch-shaped body member 2 is provided with extending ears or tabs 15 and 16 at the opposite ends thereof, by which said member may be secured to the base by the same securing elements employed to secure the plates 10 and 11. As may be seen in Fig. 4, the base 1 is formed of two parts, 17 and 18, and the latter has depending ears or tabs at each end, such as shown at 19, to which the end plates 10 and 11 are also secured. For this reason, apertures 20 and 21 are provided in the respective end plates.

The doors 3 and 4 are pivotally mounted on the end plates 10 and 11 which are provided with apertured portions 22 and 23 for that purpose. The outward movement of the doors is limited by stops 24 and 25 in the form of extending tabs on the end plates 10 and 11. As may be seen in Fig. 2, the doors are constructed so as to engage the stops 24 and 25 when fully opened.

There is also provided an arch-shaped frame member 26 which is mounted on the end plates 10 and 11 and is centrally disposed within the toaster chamber, as shown in Fig. 2. To this end, the plates 10 and 11 are provided with ears or tabs 27 and 28 adapted to receive the reduced ends 29 and 30 of said frame member. A centering plate 31 (see Fig. 2) is secured to the under side of the top portion of body member 2 and serves to support the frame member 26 in cooperation with the end plates 10 and 11. Plate 31 is centrally recessed at 32 to seat the upper edge portion of the frame member 26.

The frame member 26 serves a number of purposes. It supports the heating unit 5, in cooperation with the base 1, and it substantially closes the space about the heating unit, thus reducing visibility through the toaster when the doors are open. The frame member 26 also serves to rigidify the arch-shaped body member 2, holding the ends thereof vertical and parallel. This assures proper clearances for the doors and makes the toaster more rugged and durable.

In addition to the above-mentioned functions, frame member 26 serves to support a manually operable slider bar 33 (see Figs. 2 and 3) by which the doors are operated through the medium of links 34 and 35. One side of the frame member 26 is provided with slots 36 and 37 to accommodate pins 38 and 39 on the slider bar 33. The links 34 and 35 are connected to a common pivot 40 on the slider bar, and the other ends of the links are pivotally connected to the doors above the hinges thereof, as at 41. A knob 42 is disposed outside the toaster housing, as shown in Fig. 1, and is attached to the silder bar to operate the same. The housing member 2 is provided with a slot 43 to accommodate an extension on the slider bar to which the knob is secured.

Movement of the knob downward from the position of Fig. 1 effects opening of the doors as shown in Fig. 2. If a slice of bread is in the toasting position, downward movement of the knob will cause it to turn over, for as the door is opened the bottom of the bread slice slides outwardly along the door and the slice assumes a reversed position on the door. When the doors are fully open, they are slightly inclined downwardly, so as to assist in completing the reversal of the bread slices. A fuller description of the turnover mechanism and the functions of the curved spring members attached to the doors, as shown in Fig. 2, is given in the Myers, et al. Patent No. 2,079,382 of May 4, 1937. A helical spring 70 has its ends connected to the doors at 44 and 45, and is arranged so that it partly counterbalances the weight of the doors when they are in their fully opened position and it also maintains the doors in their closed position.

From the foregoing description, it will be seen that the invention provides a toaster having the novel structural features and advantages herein set forth. It will be understood, of course, that the invention is not limited to the specific form shown but is capable of modification, particularly as to structural details.

I claim:

1. In a bread toaster, a housing including a pair of opposed bottom-hinged doors which serve as bread slice holders, said doors being movable between a closed position and an open position in which they are slanted outwardly downward to a sufficient degree to cause the bread slices to turn over whenever the doors are opened and closed, a support centrally disposed within said housing substantially equidistant from said doors, a slider bar mounted on said support for vertical movement and facing said doors, an extension on said slider bar projecting to the outside of said housing for manual operation of the slider bar, said housing having a vertical slot through which said extension projects, a pair of links connected to said slider bar and connected respectively to said doors above the hinges thereof so as to effect opening of the doors in response to downward movement of the slide bar and to effect closing of the doors in response to upward movement of the slider bar, and spring means arranged to maintain the doors in closed position and to partly counterbalance the weight of the doors when they are in open position.

2. In a bread toaster, a housing including a pair of opposed bottom-hinged doors which serve as bread slice holders, said doors being movable between a closed position and an open position in which they are slanted outwardly downward to a sufficient degree to cause the bread slices to turn over whenever the doors are opened and closed, a planar frame member centrally disposed within said housing substantially equidistant from said doors, a slider bar mounted for vertical movement on one side of said frame member and facing said doors, an extension on said slider bar projecting to the outside of said housing for manual operation of the slider bar, said housing having a vertical slot through which said extension projects, a pair of links connected to said slider bar and connected respectively to said doors above the hinges thereof so as to effect opening of the doors in response to downward movement of the slider bar and to effect closing of the doors in response to upward movement of the slider bar, and a tension spring connected between said doors slightly above the hinges thereof, so as to maintain the doors in closed position and to partly counterbalance the weight of the doors when they are in open position.

3. In a bread toaster, a base of generally rectangular form, an arch-shaped member secured to the ends of said base and supported thereby, a pair of opposed bottom-hinged doors also supported by said base and forming with said arch-shaped member a closable housing, said doors serving as bread slice holders and being movable between a closed position and an open position in which they are slanted outwardly downward to a sufficient degree to cause the bread slices to turn over whenever the doors are opened and closed, a planar frame member centrally disposed within said housing substantially equidistant from said doors, a slider bar mounted for vertical movement on one side of said frame member and facing said doors, an extension on said slider bar projecting to the outside of said housing for manual operation of the slider bar, said arch-shaped member having a vertical slot through which said extension projects, a pair of links connected to said slider bar and connected respectively to said doors above the hinges thereof so as to effect opening of the doors in response to downward movement of the slider bar and to effect closing of the doors in response to upward movement of the slider bar, and a tension spring connected between said doors slightly above the hinges thereof, so as to maintain the doors in closed position and to partly counterbalance the weight of the doors when they are in open position.

4. In a bread toaster, a housing including a pair of opposed bottom-hinged doors which serve as bread slice holders, a planar frame member centrally disposed within said housing substantially equidistant from said doors, said frame member serving to rigidify the housing, a heating unit supported by said frame member substantially in co-planar relation therewith, the frame member also serving to reduce visibility through the toaster around said heating unit, a slider bar mounted for vertical movement on one side of said frame member and facing said doors, an extension on said slider bar projecting to the outside of said housing for manual operation of the slider bar, said housing having a vertical slot through which said extension projects, a pair of links connected to said slider bar and connected respectively to said doors above the hinges thereof to actuate the doors in response to movement of the slider bar, said links moving substantially in a plane perpendicular to the plane of said frame member and said heating unit, and a tension spring connected between said doors at the end of the toaster opposite to that at which said links are located.

5. In a bread toaster, a base of generally rectangular form, an arch-shaped member secured to the ends of said base and supported thereby, a pair of opposed bottom-hinged doors also supported by said base and forming with said arch-shaped member a closable housing, said doors serving as bread slice holders, a planar frame member centrally disposed within said housing substantially equidistant from said doors, said frame member serving to rigidify the housing, a heating unit supported by said frame member substantially in co-planar relation therewith, the frame member also serving to reduce visibility through the toaster around said heating unit, a slider bar mounted for vertical movement on one side of said frame member and facing said doors, an extension on said slider bar projecting to the outside of said housing for manual operation of the slider bar, said arch-shaped member having a vertical slot through which said extension projects, a pair of links connected to said slider bar and connected respectively to said doors above the hinges thereof to actuate the doors in response to movement of the slider bar, said links moving substantially in a plane perpendicular to the plane of said frame member and said heating unit, and a tension spring connected between said doors at the end of the toaster opposite to that at which said links are located.

CHARLES ROGER TURNER.

REFERENCES CITED

The following references are of record in the file of this patent:

UNITED STATES PATENTS

| Number | Name | Date |
|---|---|---|
| 1,105,230 | Wiltsie | July 28, 1914 |
| 1,557,028 | Colby | Oct. 13, 1925 |
| 1,639,385 | Reichold | Aug. 16, 1927 |
| 1,826,475 | Kuhn | Oct. 6, 1931 |
| 1,870,562 | Forbes | Aug. 9, 1932 |
| 2,078,662 | Hadley et al. | Apr. 27, 1937 |
| 2,194,223 | Gough | Mar. 19, 1940 |
| 2,424,433 | Brown | July 22, 1947 |